US008245413B2

(12) United States Patent
Hayashida et al.

(10) Patent No.: US 8,245,413 B2
(45) Date of Patent: Aug. 21, 2012

(54) HEAT INSULATING COVER AND MICROMETER

(75) Inventors: Shuji Hayashida, Kawasaki (JP);
Osamu Saito, Kawasaki (JP);
Shozaburo Tsuji, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 36 days.

(21) Appl. No.: 12/859,836

(22) Filed: Aug. 20, 2010

(65) Prior Publication Data
US 2011/0061256 A1 Mar. 17, 2011

(30) Foreign Application Priority Data
Sep. 11, 2009 (JP) ................... 2009-210330

(51) Int. Cl.
*G01B 3/18* (2006.01)
*G01B 5/00* (2006.01)
(52) U.S. Cl. .................. 33/831; 33/704; 33/828
(58) Field of Classification Search .............. 33/831, 33/704, 828
See application file for complete search history.

(56) References Cited

U.S. PATENT DOCUMENTS

| | | | | | |
|---|---|---|---|---|---|
| 361,056 | A | * | 4/1887 | Emery | 33/704 |
| 769,197 | A | * | 9/1904 | Spalding | 33/704 |
| 1,213,134 | A | * | 1/1917 | Fellows | 33/501.09 |
| 1,217,312 | A | * | 2/1917 | Johansson | 33/501.3 |
| 1,964,425 | A | * | 6/1934 | Bowman | 33/485 |
| 3,123,917 | A | * | 3/1964 | Haluska | 33/709 |
| 3,247,599 | A | * | 4/1966 | O'Connor | 33/613 |
| 3,892,267 | A | * | 7/1975 | Bibeau | 150/160 |
| 4,305,206 | A | * | 12/1981 | Roe | 33/770 |
| 4,550,507 | A | * | 11/1985 | Nishikata | 33/701 |
| 5,052,121 | A | * | 10/1991 | Wachtler | 33/813 |
| 5,433,015 | A | * | 7/1995 | Mazenet | 33/815 |
| 5,574,381 | A | * | 11/1996 | Andermo et al. | 324/660 |
| RE35,596 | E | * | 8/1997 | Diener et al. | 150/160 |
| 6,176,021 | B1 * | | 1/2001 | Sato et al. | 33/813 |
| 6,243,965 | B1 * | | 6/2001 | Zanier et al. | 33/831 |
| 6,267,236 | B1 * | | 7/2001 | Seok | 206/320 |
| 6,309,721 | B1 * | | 10/2001 | Gladfelter et al. | 428/36.1 |
| 6,519,867 | B1 * | | 2/2003 | Saeki | 33/813 |
| 6,792,686 | B2 * | | 9/2004 | Krehel et al. | 33/382 |
| 6,952,882 | B2 * | | 10/2005 | Raab et al. | 33/503 |
| 6,957,808 | B2 * | | 10/2005 | Varzino et al. | 269/95 |
| 7,004,315 | B2 * | | 2/2006 | Gordon et al. | 206/232 |
| 7,291,047 | B1 * | | 11/2007 | Jones et al. | 440/71 |

FOREIGN PATENT DOCUMENTS

| | | | |
|---|---|---|---|
| CA | 2386344 A1 * | 11/2003 | |
| JP | 10-253303 | 9/1998 | |
| JP | 10-253304 | 9/1998 | |

* cited by examiner

*Primary Examiner* — Christopher Fulton
(74) *Attorney, Agent, or Firm* — Rankin, Hill & Clark LLP

(57) ABSTRACT

Disclosed is a micrometer with an improved a heat-insulating property. A micrometer 10 with a U-shaped frame 20 supporting an anvil 12 and a spindle 14 at tip end portions thereof so that the anvil 12 and the spindle 14 are coaxially opposed to each other is provided with a heat insulating cover 50. The heat insulating cover 50 is shaped to accommodate a bottom portion of the frame 20, and is detachable with respect to the frame 20. The heat insulating cover 50 covers a bottom face 22 of the frame 20 while supporting the bottom portion of the frame 20 by sandwiching from both sides of the frame 20.

22 Claims, 15 Drawing Sheets

A-A'

HEAT INSULATING COVER AND MICROMETER

BACKGROUND OF THE INVENTION

1. Field of the Invention

The present invention relates to a heat insulating cover and a micrometer. More particularly, the present invention relates to a heat insulating cover for micrometer capable of reducing influences on a measurement result by temperatures.

2. Description of the Related Art

A conventionally available micrometer is described in Japanese Patent Application Laid-Open No. H10-253303 (Patent Document 1), which is capable of suppressing influences of thermal expansion by heat of hands. The micrometer described in Patent Document 1 is configured to cover the surface of a frame with resin, thus preventing heat of hands from being transferred directly to the frame when grasping the frame with hands, meaning suppressing of influences of thermal expansion by the heat of hands.

[Patent Document 1] Japanese Patent Application Laid-Open No. H10-253303

The conventional micrometer described in Patent Document 1, however, cannot realize a sufficient heat-insulating effect when high-precision measurement is required, and causes a problem that thermal expansion of the frame affects a measurement result. Although thicker resin covering the frame might improve the heat-insulating effect, the frame will be made extremely thick, causing a problem of impairing operability of the micrometer when the micrometer is attached to a stand for use or is operated with one hand.

SUMMARY OF THE INVENTION

In order to cope with the above-stated problems, it is an object of the present invention to provide a heat insulating cover for micrometer. This object is achieved by the combination of features described in independent claims of the present invention. Dependent claims thereof define further advantageous specific embodiments of the present invention.

According to the present invention, a heat insulating cover for micrometer is provided, the micrometer including a U-shaped frame supporting an anvil and a spindle at tip end portions thereof so that the anvil and the spindle are coaxially opposed to each other. The heat insulating cover is shaped to accommodate a bottom portion of the frame, and is detachable with respect to the frame.

The heat insulating cover may cover a bottom face of the frame while supporting the bottom portion of the frame by sandwiching from both sides of the frame.

The heat insulating cover may include: a first cover portion and a second cover portion engaging with a first face and a second face of the frame, respectively, the first face and the second face opposed to each other; and an elastic body that biases the first cover portion to the first face and the second cover portion to the second face.

In the heat insulating cover, the elastic body may include a flat spring or a coil spring provided from the first cover portion to the second cover portion so as to cover the bottom face of the frame.

The heat insulating cover may include hooks engaging with recesses formed in the first face and the second face of the frame, the first face and the second face opposed to each other.

The heat insulating cover may include an inner face forming a space with the accommodated frame.

The inner face may be provided with a rib protruding toward the frame.

The rib may be in a sheet-form with an end face thereof directed to the frame.

The inner face may be provided with a protrusion protruding toward the frame, and the heat insulating cover may be fastened to the frame at the protrusion.

The heat insulating may include a bottom face allowing the micrometer to self-stand, while accommodating the frame.

The heat insulating cover may include: a base and a rotating part that rotates with reference to the base. The bottom face may include a continuous flat face including lower faces of the base and the rotating part, and the rotating part is rotatable from a state of the flat face formed with the lower faces of the base and the rotating part until the rotating part covers the bottom face of the frame.

The rotating part may include a latch that is latched with the bottom face of the frame while covering the bottom face of the frame.

The rotating part may include a latch that is latched with the base while forming the flat face.

According to another aspect of the present invention, a micrometer including the above-stated heat insulating cover is provided.

DESCRIPTION OF THE PREFERRED EMBODIMENTS

Figure 1:
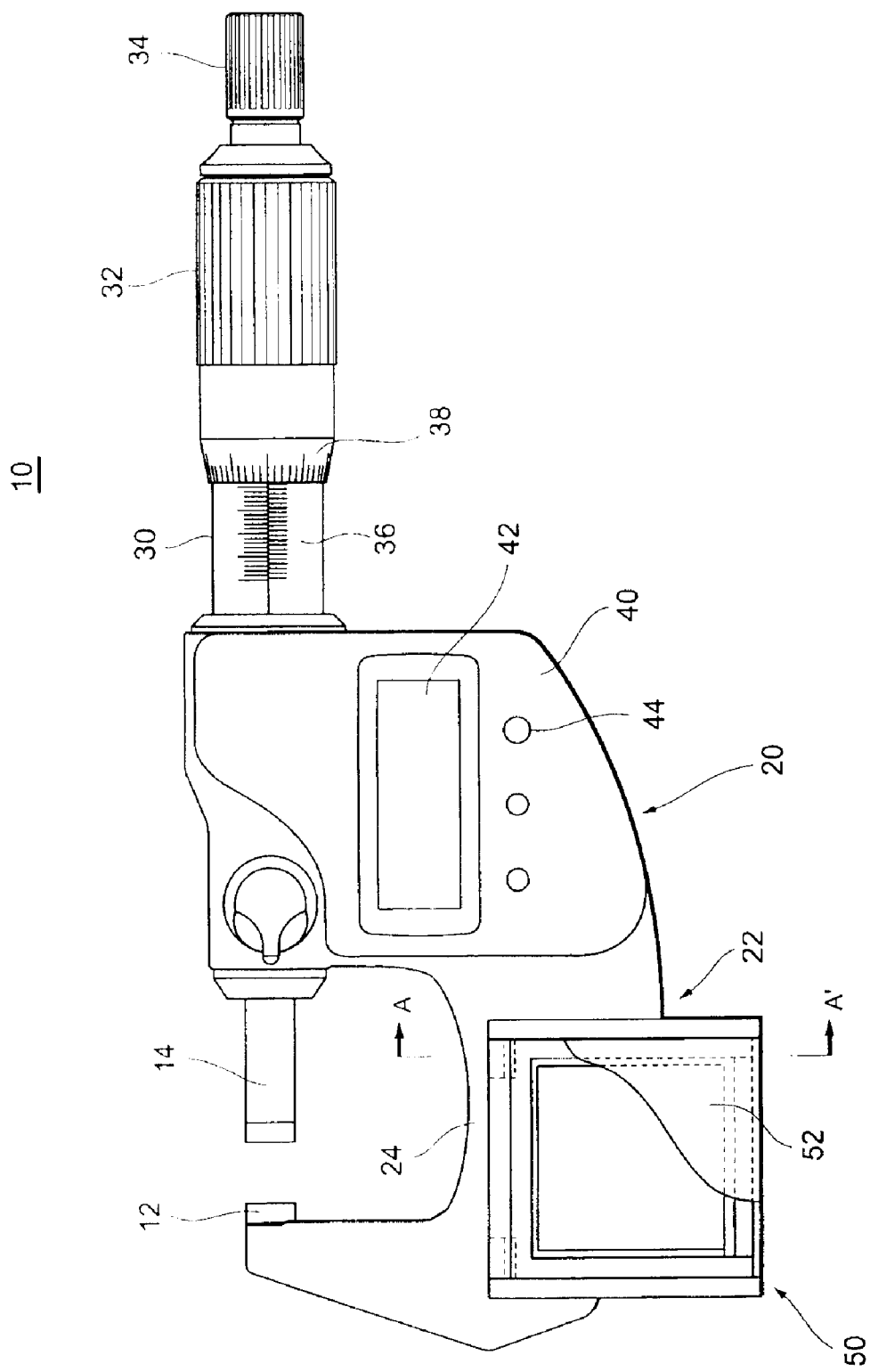
FIG. 1 is a front view of a micrometer with a heat insulating cover attached thereto.

Referring to the drawings, the following describes the present invention by way of embodiments. The following embodiments, however, do not limit the invention according to claims, and all combinations of the features described in the embodiments are necessarily essential to means for solving the problems in the invention. In the specification and the drawings, the same reference numeral will be assigned to elements with a substantially same functional configuration so as to omit duplicated description therefor.

Figure 2:
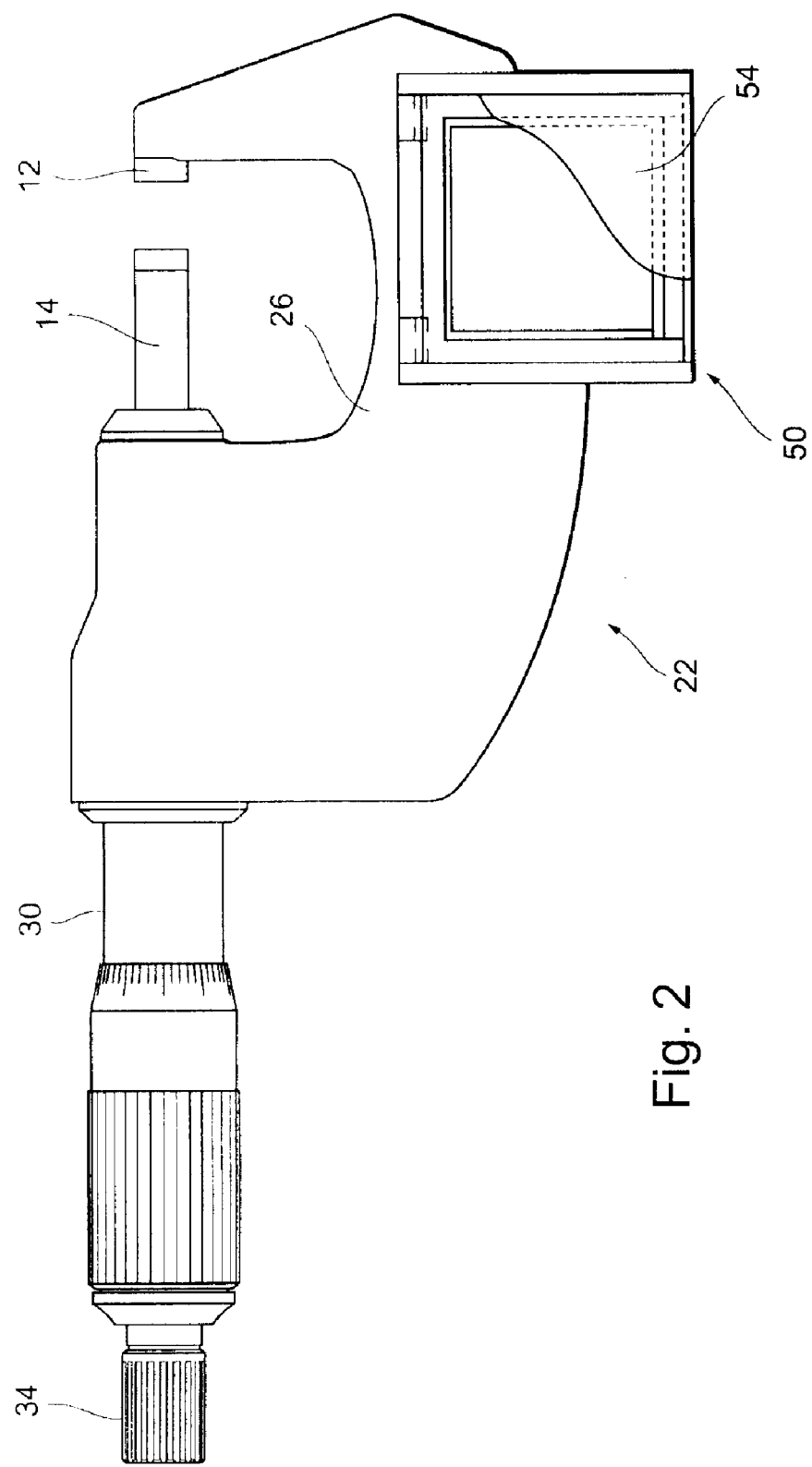
FIG. 2 is a back view of a micrometer with a heat insulating cover attached thereto.
Figure 3:
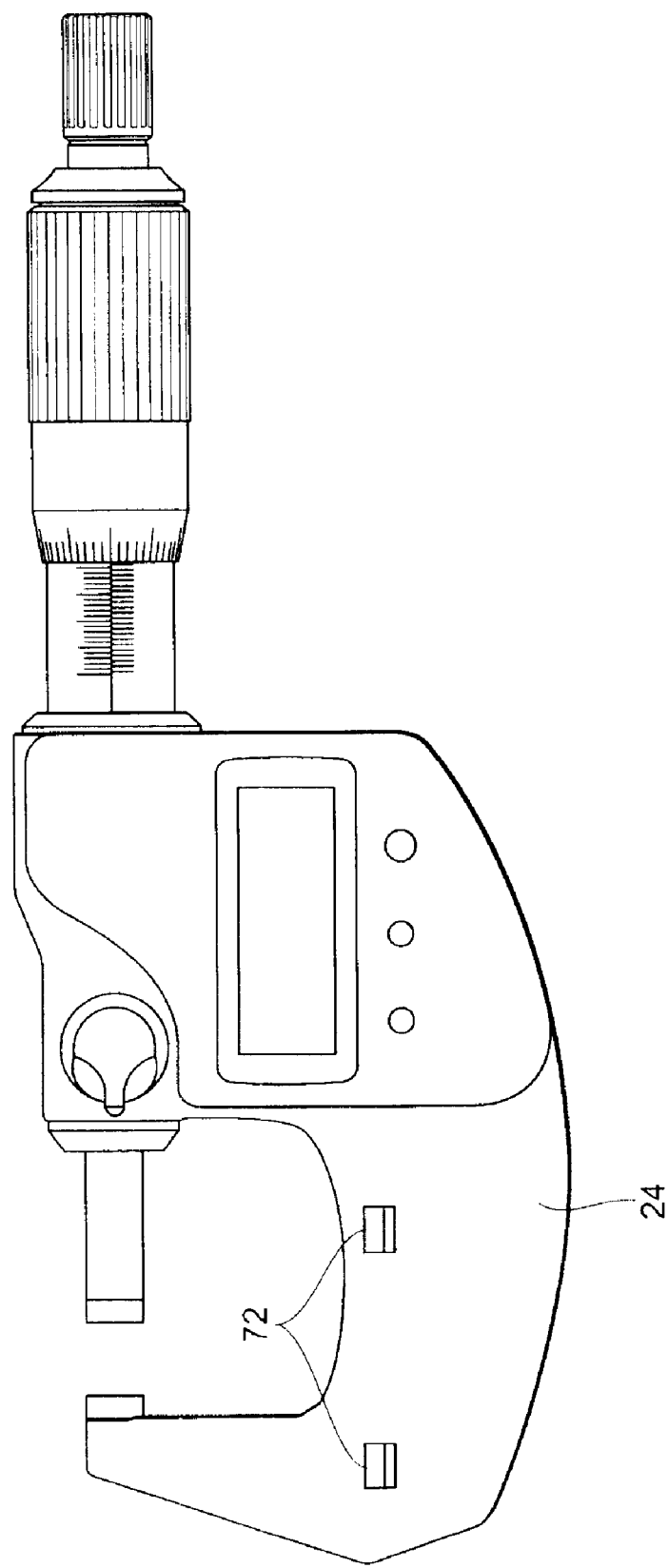
FIG. 3 is a front view of a micrometer with a heat insulating cover not attached thereto.
Figure 4:
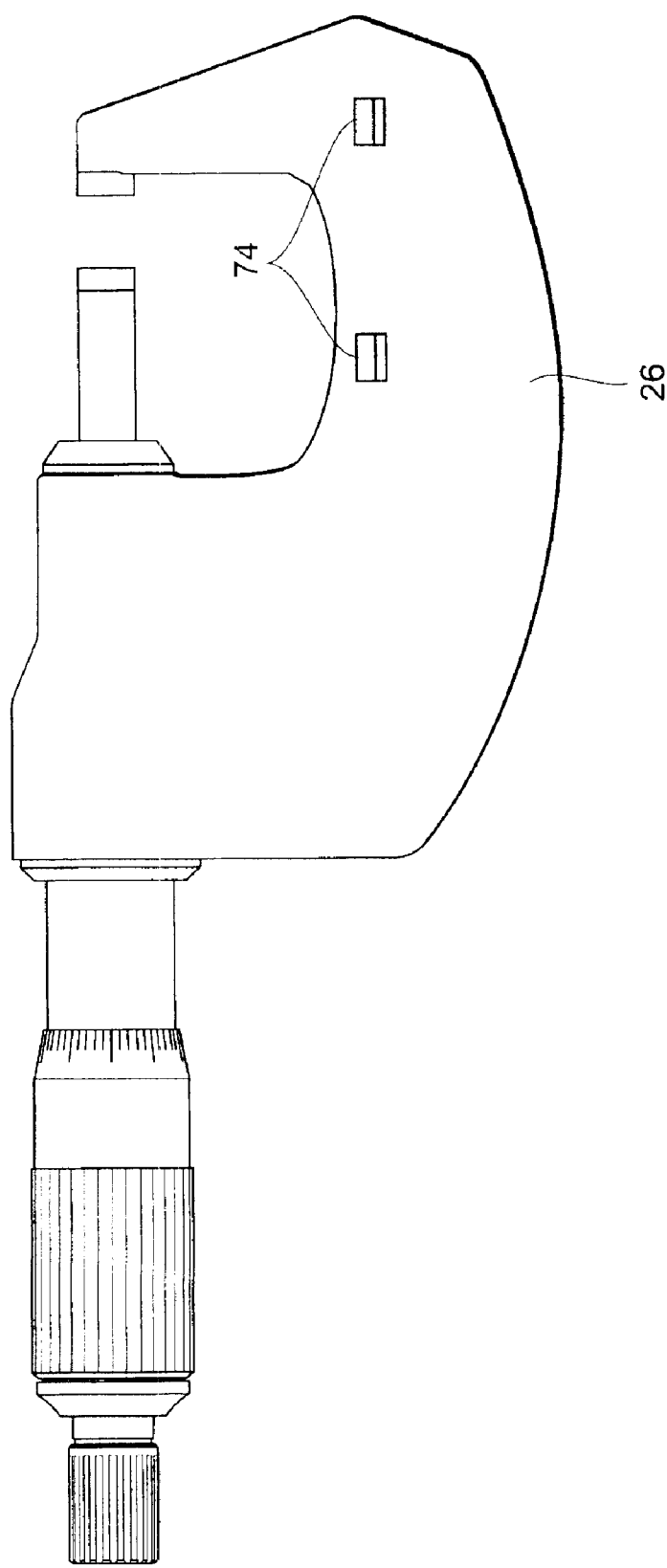
FIG. 4 is a back view of a micrometer with a heat insulating cover not attached thereto.
Figure 5A:
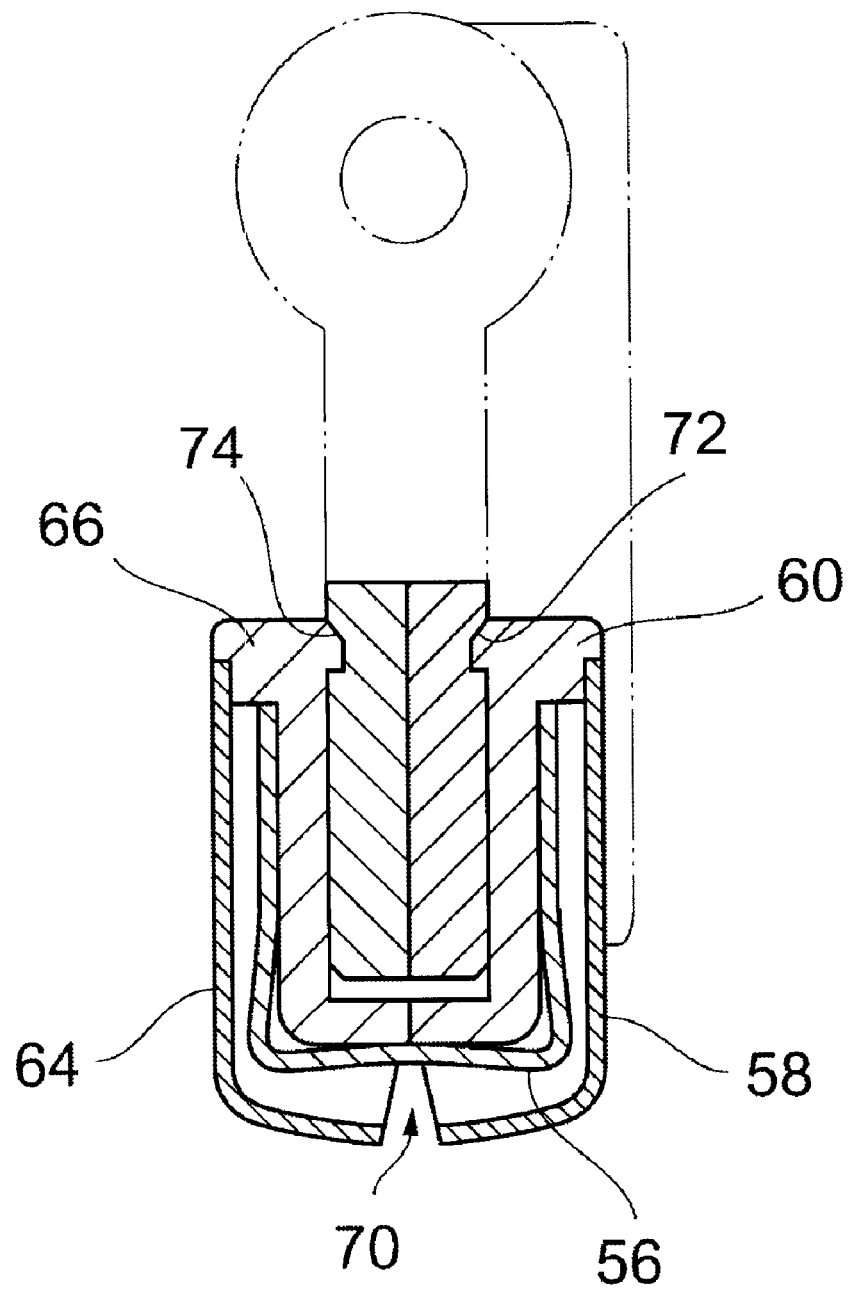
FIG. 5A illustrates a cross-section of the heat insulating cover taken along the line AA' of FIG. 1.
Figure 5B:
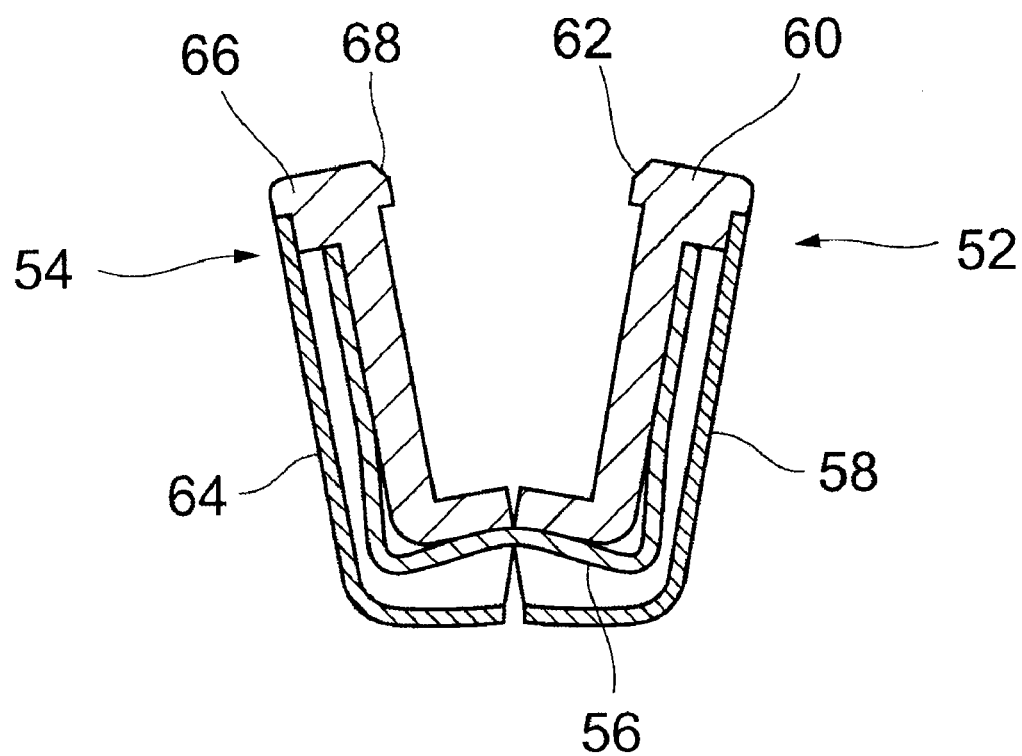
FIG. 5B illustrates a cross-section of the heat insulating cover taken along the line AA' of FIG. 1.

FIG. 1 to FIG. 5 illustrate a micrometer 10 with a heat insulating cover according to one embodiment of the present invention. FIG. 1 and FIG. 3 are front views of the micrometer 10 with a heat insulating cover attached or not attached thereto, respectively, and FIG. 2 and FIG. 4 are back views of the micrometer 10 with a heat insulating cover attached or not attached thereto, respectively. FIG. 5A is a left-side view of the micrometer 10 with a heat insulating cover attached thereto, where a cross-sectional view taken along the line AA' in FIG. 1 is illustrated only for a heat insulating cover 50 for convenience in description. FIG. 5B is a cross-sectional view of a heat insulating cover, illustrating a state of opening one end thereof.

The micrometer 10 includes: a substantially U-shaped frame 20; an anvil 12 provided at one end of the frame 20; a spindle 14 provided at the other end of the frame 20; a sleeve 30 fitted with the frame 20 at the other end of the frame 20; and the heat insulating cover 50 provided detachably with respect to the frame 20.

The frame 20 is formed in a U-shape by folding a metal plate processed in a predetermined shape. The frame 20 may have a protective film such as resin covering it on the surface. The frame 20 has a first face 24 and a second face 26 each having a U shape as well as a bottom face 22.

The anvil 12 is provided at one end of the U-shaped frame 20, and the spindle 14 is provided at the other end of the frame 20. More specifically, the anvil 12 is provided in a space defined by the frame 20 so as to protrude from the frame 20 toward the space. The spindle 14 is provided in the space defined by the frame 20 so as to protrude from the frame 20 toward the space and to be opposed to the anvil 12. The anvil 12 and the spindle 14 each have a cylindrical shape, the axes of which are coaxially provided. The spindle 14 is provided movable along the axis so as to change a distance from the anvil 12.

The sleeve 30 accommodates the spindle 14 therein while allowing the spindle 14 to move along the axis. At the other end of the frame 20, the sleeve 30 has one end fitted with the other side of the spindle 14.

At the other end of an outer sleeve of the sleeve 30 is provided a thimble 32 that can rotate about the axis along which the spindle 14 moves, the thimble 32 fitted with the outside of the other end. The thimble 32 is provided operatively associated with the spindle 14 at the inside of the sleeve 30, so that the spindle 14 moves by a predetermined amount in a predetermined direction along the axis in accordance with the rotation amount and the rotation direction of the thimble 32. Accordingly, in the internal space of the U-shaped frame 20, a distance between the anvil 12 and one end of the spindle 14 changes. At the other end of the spindle 14 is provided a ratchet 34. The ratchet 34 is configured to idle when a certain level or more of load is applied to the spindle 14.

The first face 24 of the frame 20 is provided with a display panel 40. The display panel 40 includes a display 42 and a plurality of buttons 44. When any one of the plurality of buttons 44 is pressed, the display 42 displays contents corresponding to the button such as a distance between the anvil 12 and the spindle 14.

The heat insulating cover 50 is provided detachably with respect to the frame 20. The heat insulating cover 50 engages with the frame 20 at the first face 24 and the second face 26 and supports the frame 20 by sandwiching so as to cover the bottom face 22. More specifically, the first face 24 and the second face 26 of the frame 20 have a plurality of recesses 72 and 74, respectively, so that the heat insulating cover 50 engages with the recesses 72 and 74 to support the frame 20 by sandwiching.

The heat insulating cover 50 has a shape accommodating the bottom portion of the frame 20. The heat insulating cover 50 includes a first cover portion 52 covering the first face 24 of the frame 20 and a second cover portion 54 covering the second face 26 of the frame 20. The first cover portion 52 is shaped so as to cover the frame 20 from the first face 24 to a part of the bottom face 22, and the second cover portion 54 is shaped so as to cover the frame 20 from the second face 26 to the bottom face 22. More specifically, the first cover portion 52 and the second cover portion 54 are L-shaped in the AA' cross-section in FIG. 1. Further, the first cover portion 52 and the second cover portion 54 are provided so that their one ends and other ends face each other to make the cross-section of the heat insulating cover 50 a U shape. The first cover portion 52 and the second cover portion 54 are configured at least to cover the bottom portion including the bottom face 22 of the frame 20.

The first cover portion 52 and the second cover portion 54 include first members 58 and 64 disposed outside of the heat insulating cover 50 and second members 60 and 66 disposed inside of the heat insulating cover 50, respectively. The second members 60 and 66 include, at one end of the upper side thereof, hooks 62 and 68, respectively, protruding inwardly from the surface. The hooks 62 and 68 are shaped and arranged so as to fit with the plurality of recesses 72 and 74 of the first face 24 and the second face 26, respectively, when the heat insulating cover 50 is attached to the frame 20. The first members 58 and 64 are shaped so that a gap 70 of a predetermined distance is formed between the other ends thereof on the lower side when the heat insulating cover 50 is attached to the frame 20.

The heat insulating cover 50 includes a flat spring 56 as one example of an elastic body. The flat spring 56 is provided from the first cover portion 52 to the second cover portion 54. More specifically, the flat spring 56 has a U shape in cross section, substantially a half of which is provided at the first cover portion 52 between the first member 58 and the second member 60 and substantially the other half of which is provided at the second cover portion 54 between the first member 64 and the second member 66.

The flat spring 56 biases, at the first cover portion 52, the second member 60 in the direction toward the second cover portion 54, and biases, at the second cover portion 54, the second member 66 in the direction toward the first cover portion 52. In other words, the flat spring 56 functions to make forces act on the second members 60 and 66 in the direction of closing one ends of the first cover portion 52 and the second cover portion 54 of the heat insulating cover 50. Thereby, when the heat insulating cover 50 is attached to the frame 20, the hooks 62 and 68 provided at one ends of the first cover portion 52 and the second cover portion 54 are pressed against the first face 24 and the second face 26, respectively, thus engaging with the recesses 72 and 74. In the present embodiment, the heat insulating cover 50 includes the flat spring 56 as one example of an elastic body, which is not a limiting example of the elastic body, as long as it can function to make forces act on the second members 60 and 66 in the direction of closing one ends of the first cover portion 52 and the second cover portion 54, such as a coil spring.

According to the above-stated present embodiment, the heat insulating cover 50 can accommodate the bottom portion of the frame 20 of the micrometer 10, thus achieving a sufficient heat-insulating effect against heat of user's hands and enabling high-precision measurement. Since the heat insulating cover 50 is provided detachably with respect to the frame 20, the heat insulating cover 50 can be detached and attached with respect to the frame 20 if needed. Therefore, operability is not impaired even when measurement is conducted using a stand or with one hand, while enabling high-precision measurement. According to the present embodiment, depending on a required heat-insulating level, the heat insulating cover 50 can be exchanged to make the heat insulating cover 50 larger or smaller.

According to the present embodiment, the first cover portion 52 and the second cover portion 54 of the heat insulating cover 50 are biased at one ends by the flat spring 56 as one example of an elastic body in the direction of closing the one ends. This allows a user to easily open and close one ends of the first cover portion 52 and the second cover portion 54 of the heat insulating cover 50 with hands, so that the user can easily attach and detach the heat insulating cover 50 with respect to the frame 20.

According to the present embodiment, the flat spring 56 applies a force to the second members 60 and 66 so as to sandwich the frame 20 therebetween, and the first members 58 and 64 are provided to the frame 20 outside of the flat spring 56, so that a heat-insulating property can be improved. According to the present embodiment, a space can be provided between the flat spring 56 and the first member 58 or 64 in the heat insulating cover 50, thus suppressing heat of user's hands in contact with the first members 58 and 64 from being transferred to the frame 20, whereby a heat-insulating property can be further improved.

Figure 6:
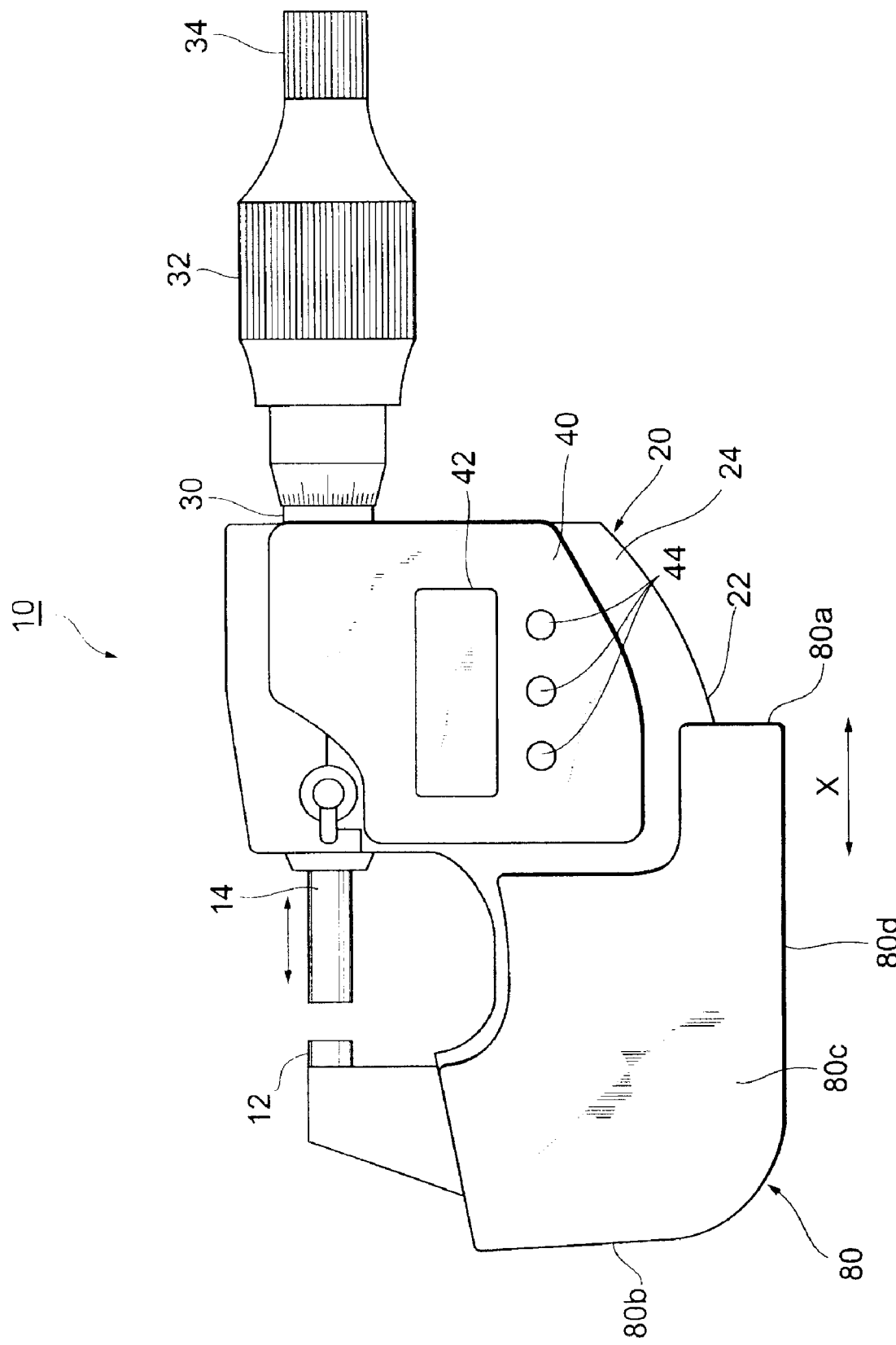
FIG. 6 is a front view of a micrometer.
Figure 7:
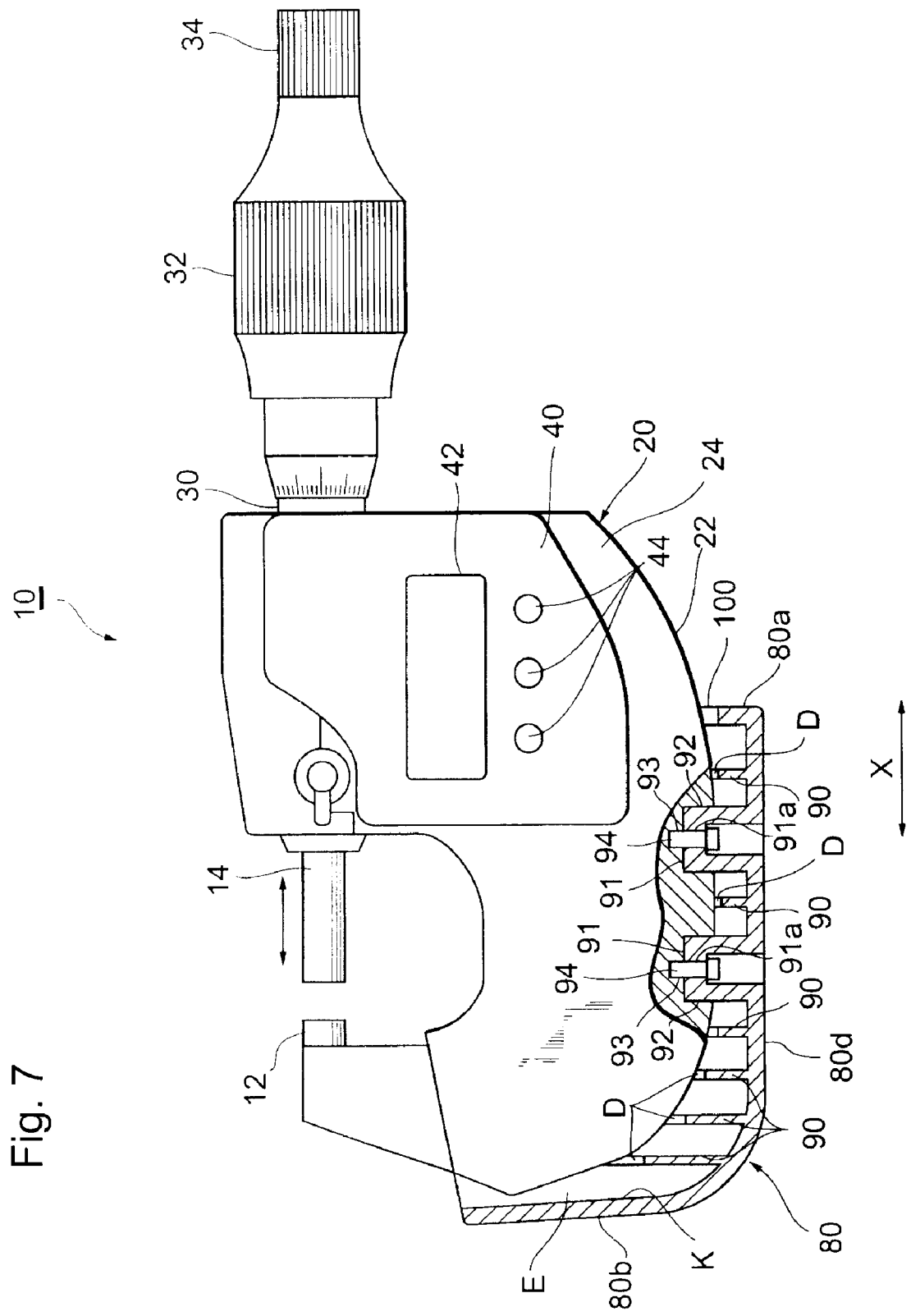
FIG. 7 is a front view of a micrometer, illustrating the cross-section of the heat insulating cover.

The following describes another embodiment of the present invention. FIG. 6 illustrates a micrometer 10 with a heat insulating cover 80 according to the present embodiment. FIG. 7 is a front view of the micrometer 10, illustrating the cross-section of the heat insulating cover 80.

Attached to a frame 20 of the micrometer 10 is the heat insulating cover 80 accommodating a bottom portion of the frame 20. The heat insulating cover 80 is detachable with respect to the frame 20.

Figure 8:
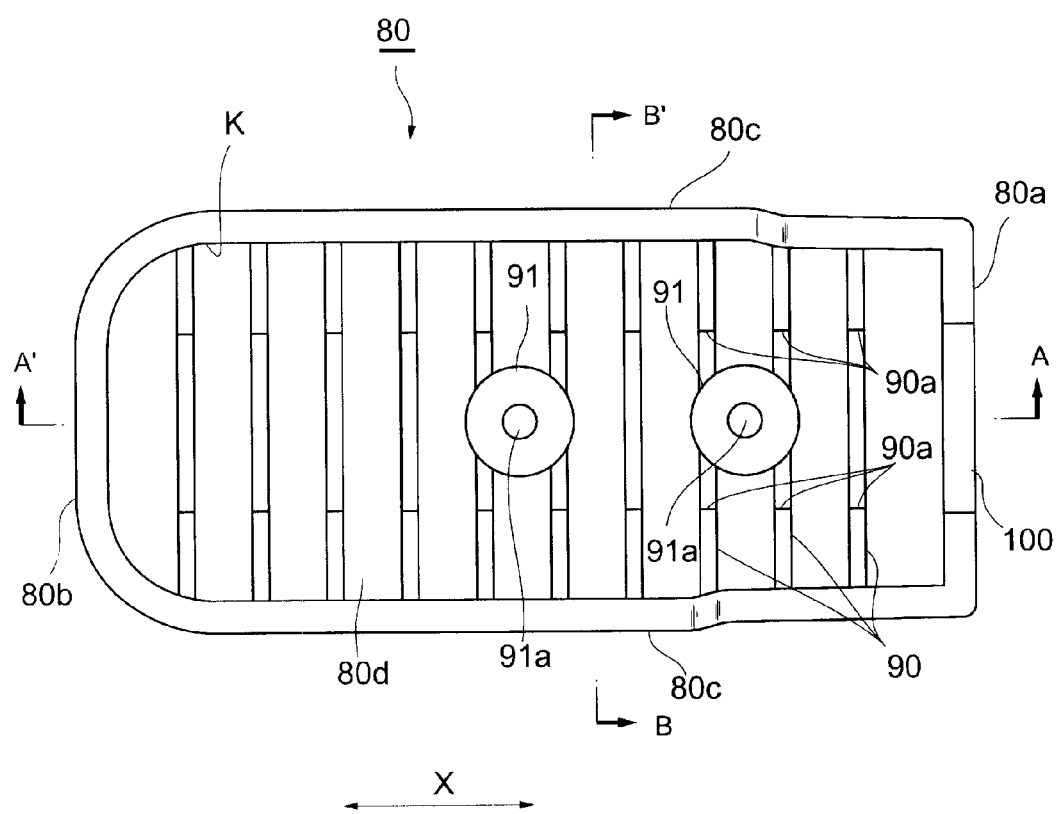
FIG. 8 is a top view of a heat insulating cover.
Figure 9:
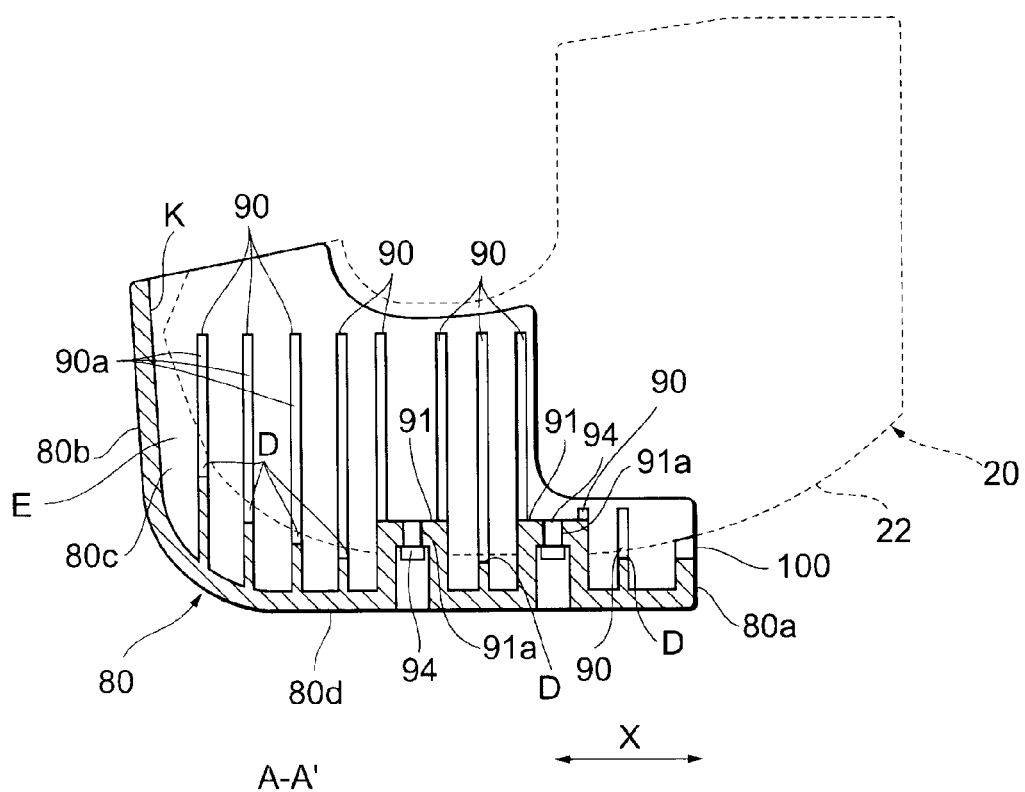
FIG. 9 is a vertical cross-sectional view of the heat insulating cover taken along the X direction.
Figure 10:
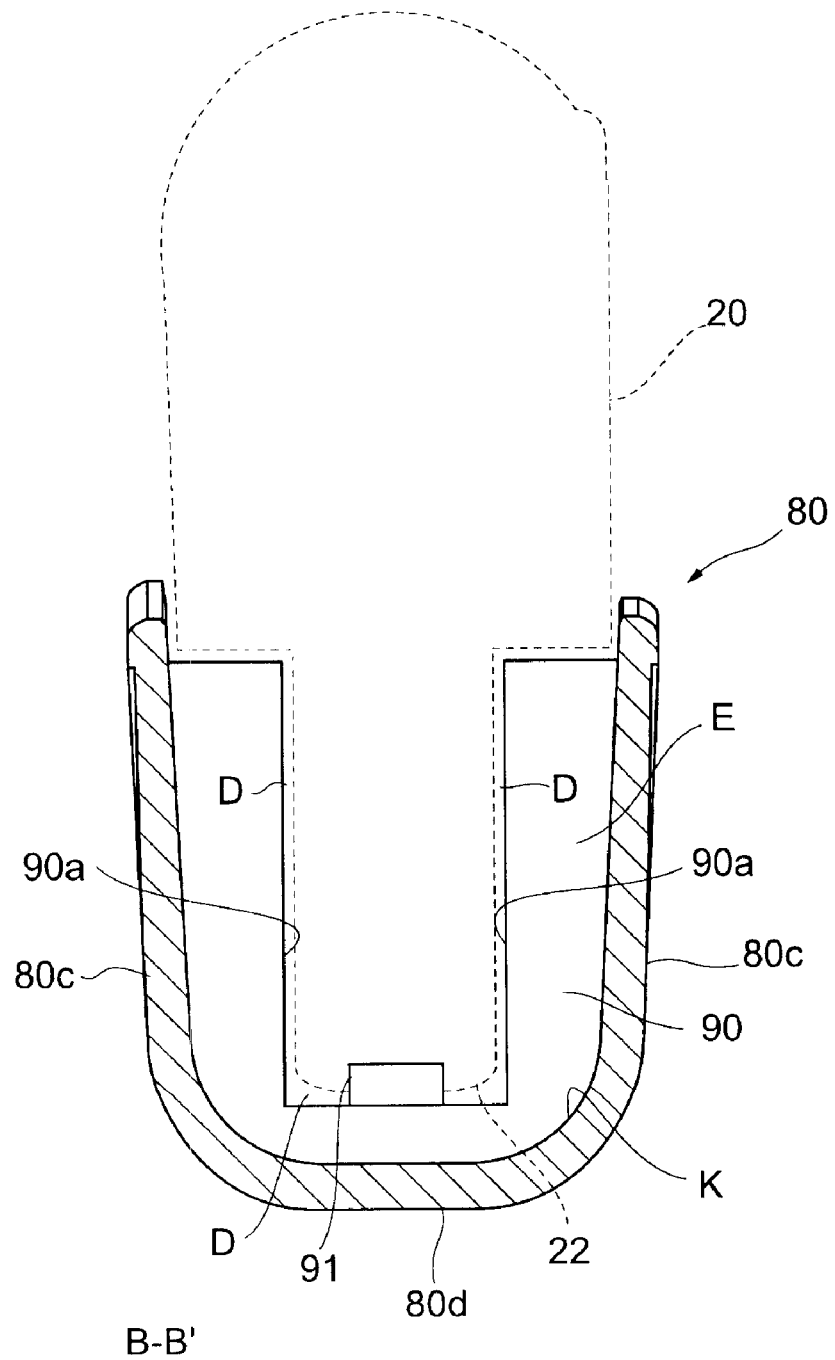
FIG. 10 is a vertical cross-sectional view of the heat insulating cover viewed from the X direction.

FIG. 8 is a top view of the heat insulating cover 80 removed from the frame 20, FIG. 9 is a cross-sectional view of the heat insulating cover 80 of FIG. 8 taken along the line A-A', and FIG. 10 is a cross-sectional view of the heat insulating cover 80 of FIG. 8 taken along the line B-B'.

The heat insulating cover 80 is formed in an L shape, for example, accommodating and covering the bottom portion of the frame 20 except for a display panel 40. The heat insulating cover 80 is open at an upper face in FIG. 9, and is closed at a part of a right side face, at left side face, a front face, a rear face and a bottom face. That is, the heat insulating cover 80 includes a right side face 80a, a left side face 80b, a front face and a rear face 80c, and a bottom face 80d. The heat insulating cover 80 may be made of resin or metal with heat conductivity lower than that of the frame 20 and a heat-insulating property higher than that of the frame 20, for example.

The bottom face 80d of the heat insulating cover 80 is flat. Thereby, the micrometer 10 can self-stand. Herein, the bottom face 80d and the axis of a spindle 14 and an anvil 12 are parallel to each other, so that when the micrometer 10 stands on a horizontal plane, the axis of the spindle 14 and the anvil 12 also will be horizontal.

An inner face K of the heat insulating cover 80 forms a space E with the frame 20. The inner face K of the heat insulating cover 80 is provided with a plurality of ribs 90 that are in straight sheet form. Each rib 90 is formed in a U shape, a face of which is directed in the X direction and is aligned along the X direction. The ribs 90 are disposed at regular intervals, for example, along the X direction. In a space inside of the ribs 90, the frame 20 is provided, where the ribs 90 surround a bottom face 22, a first face 24 and a second face 26 of the frame 20 while leaving an end face 90a thereof facing the frame 20 on the inside.

The bottom face 80d of the heat insulating cover 80 is formed with a plurality of, e.g., two protrusions 91 protruding upwardly. The protrusions 91 protrude upwardly from the bottom portion of the U-shaped ribs 90. At a center of the protrusion 91 is formed a through hole 91a. On the other hand, the bottom face 22 of the frame 20 is formed with a hollow 92 into which the protrusion 91 can be inserted as illustrated in FIG. 7. At a center of the bottom of the hollow 92 is formed a screw hole 93. The protrusion 91 of the heat insulating cover 80 is inserted into the hollow 92 of the frame 20, and a screw 94 is passed through the through hole 91a from below the heat insulating cover 80 and is secured to the screw hole 93, whereby the heat insulating cover 80 and the frame 20 are fastened. In this way, the heat insulating cover 80 can be attached and detached with respect to the frame 20. When an external force is not applied, the heat insulating cover 80 and the frame 20 are not in contact at portions other than the protrusions 91, so that a gap D may be formed between the heat insulating cover 80 including the end faces 90a of the ribs 90 and the frame 20.

The right side face 80a of the heat insulating cover 80 is formed with a concave notch 100, in which the frame 20 is accommodated.

At the time of measurement using the thus configured micrometer 10, a person conducting the measurement grasps the heat insulating cover 80 to hold the micrometer 10. If needed, the heat insulating cover 80 may be removed from the frame 20, and the micrometer 10 may be attached to a stand for use. If needed, the micrometer 10 may self-stand for use with the heat insulating cover 80 attached thereto.

According to the present embodiment, since the heat insulating cover 80 can accommodate the bottom portion of the frame 20 of the micrometer 10, a sufficient heat-insulating effect against heat of user's hands can be obtained, thus enabling high-precision measurement. Since the heat insulating cover 80 is provided detachably with respect to the frame 20, the heat insulating cover 80 can be detached and attached with respect to the frame 20 if needed. Therefore, operability is not impaired even when measurement is conducted using a stand or with one hand, while enabling high-precision measurement.

The heat insulating cover 80 includes the inner face K forming the space E with the accommodated frame 20, thus suppressing heat of the heat insulating cover 80 from being transferred to the frame 20 and effectively preventing thermal expansion of the frame 20 due to heat from the person.

The inner face K of the heat insulating cover 80 is provided with the ribs 90 protruding toward the frame 20, and therefore inward distortion of the heat insulating cover 80 can be suppressed when the person conducting measurement holds the heat insulating cover 80. Thereby, a contact of the heat insulating cover 80 with the frame 20 can be suppressed when an external force is applied to the heat insulating cover 80, thus suppressing heat transfer from the heat insulating cover 80 to the frame 20 and therefore suppressing thermal expansion of the frame 20.

The ribs 90 are in a sheet form with the end faces 90a directed to the frame 20, and therefore even when the ribs 90 come in contact with the frame 20, the end faces 90a of a small area only come in contact with the frame 20, so that heat conduction from the heat insulating cover 80 to the frame 20 can be minimized. Note here that the shape of the ribs 90 may be other shapes such as a cylindrical form.

The bottom face 80d of the inner face K of the heat insulating cover 80 is provided with the protrusions 91 protruding toward the frame 20, and the heat insulating cover 80 and the frame 20 are fastened by screws at the protrusions 91. Thereby, a contact amount of the heat insulating cover 80 and the frame 20 can be reduced, thus suppressing heat transfer between the heat insulating cover 80 and the frame 20. In the present embodiment, the heat insulating cover 80 is fastened to the frame 20 by screws. However, they are fastened by other fastening means such as by mutually fitting.

Since the flat bottom face 80d of the heat insulating cover 80 allows the micrometer 10 to self-stand on a horizontal plane, the micrometer 10 can be used in a stand state if needed. In this case, there is no need to attach the micrometer 10 to a stand, and therefore the micrometer 10 can be quickly switched between the state of holding the micrometer 10 with hands and the state of placing the micrometer 10 on a table or the like, thus leading to excellent operability.

Similarly to the heat insulating cover 80 in the present embodiment, the heat insulating cover 50 of the above-stated embodiment also may be formed with a flat bottom face, for example, so that the micrometer 10 can self-stand. A flat bottom face of the heat insulating cover 80 or the heat insulating cover 50 is not indispensable to enable the micrometer 10 to self-stand, and the micrometer 10 may have other shapes with concaves and convexes or other configurations as long as the micrometer 10 can self-stand.

Figure 11:
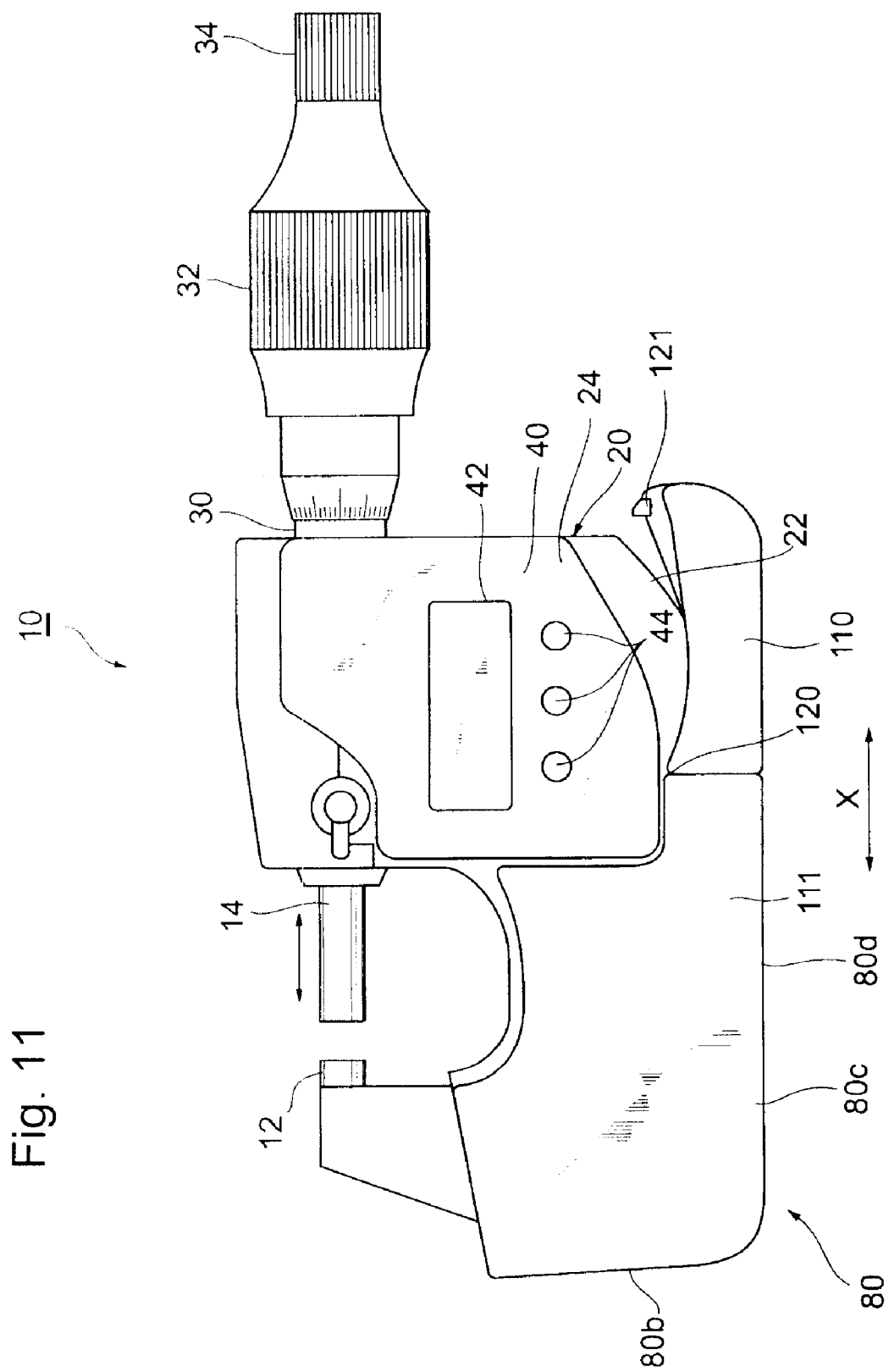
FIG. 11 is a front view of a micrometer with a rotating part.
Figure 12:
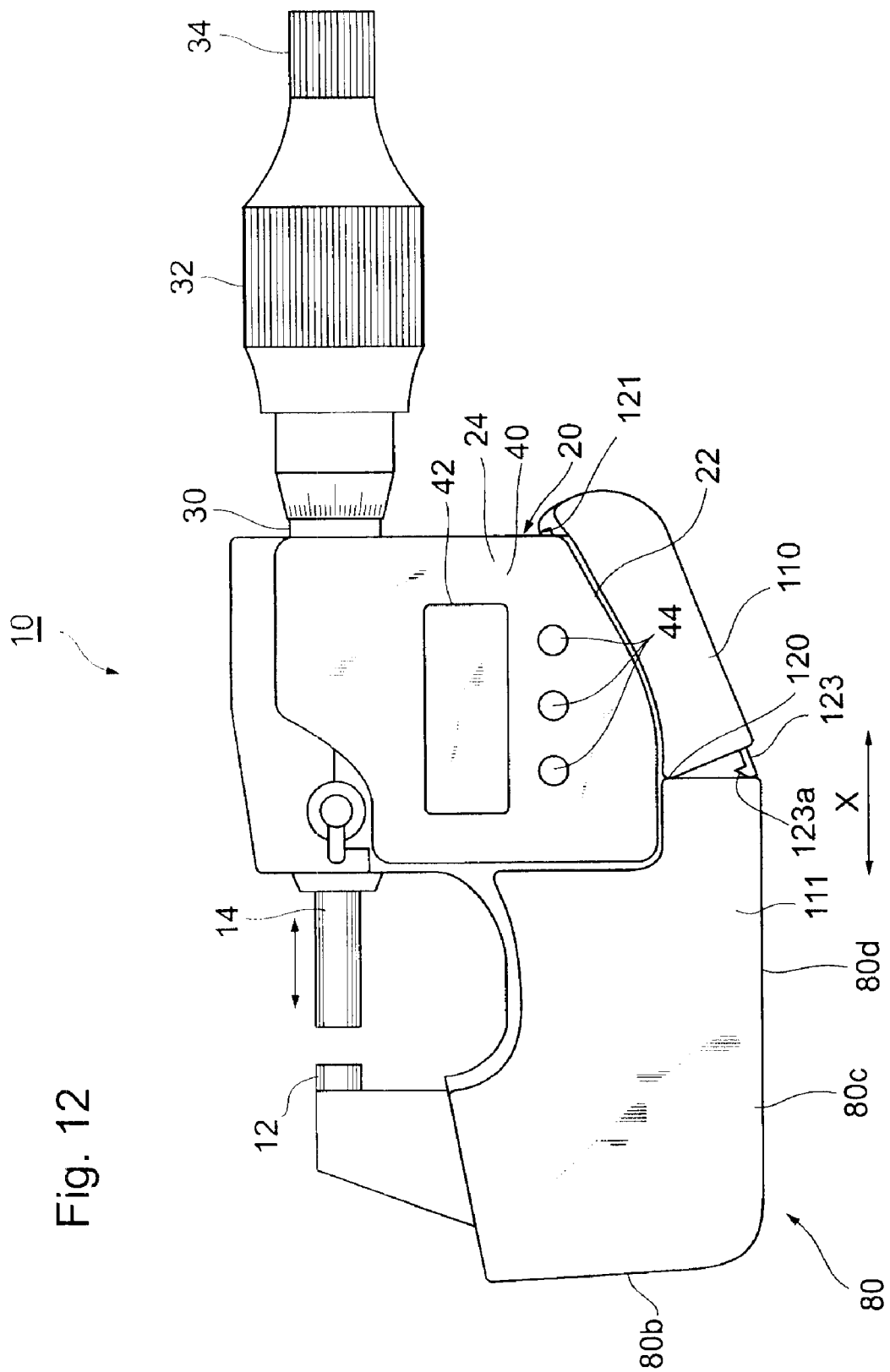
FIG. 12 is a front view of the micrometer when the rotating part rotates.

The heat insulating cover 80 described in the above embodiment may have a rotating part 110 as illustrated in FIG. 11 and FIG. 12. In such a case, the heat insulating cover 80 is extended, for example, from a base 111 on the anvil 12 side to a position below the display panel 40, where the extended portion forms the rotating part 110. Herein, the base 111 is a portion other than the rotating part 110 of the heat insulating cover 80. Lower faces of the rotating part 110 and the base 111 form a continuous flat bottom face 80d. The rotating part 110 is connected with the base 111 by a hinge 120. The hinge 120 is formed, for example, at an upper end portion of the connecting part between the rotating part 110 and the base 111. The rotating part 110 rotates about the hinge 120 from the state where the rotating part 110 and the base 111 are flat at the lower faces (bottom face 80d) until the rotating part 110 comes in contact with the curved bottom face 22 of the frame 20 so as to cover the bottom face 22.

Figure 13:
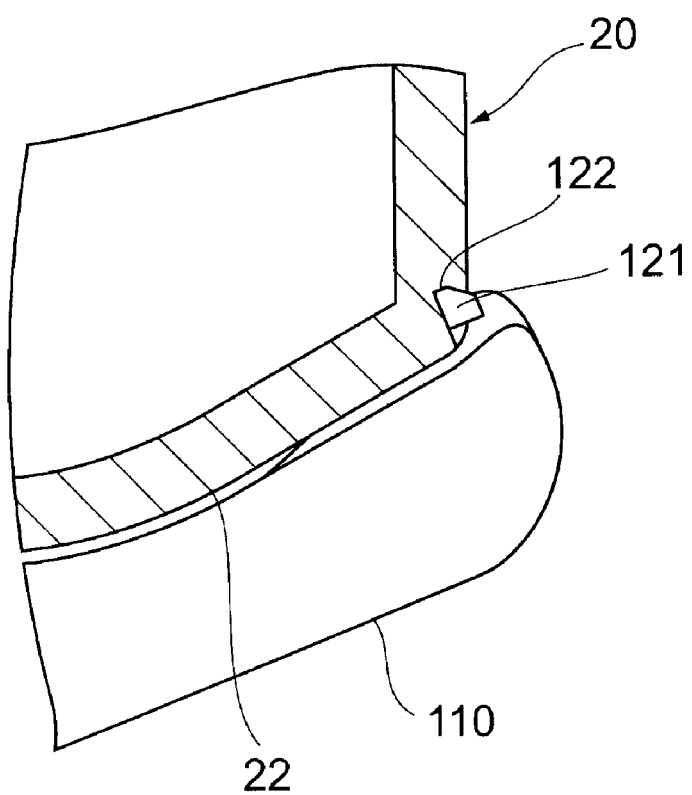
FIG. 13 is a vertical cross-sectional view describing a latch at a tip end of the rotating part.

A tip of the rotating part 110 is provided with, for example, a latch 121 that is latched in contact with the bottom face 22 of the frame 20 as illustrated in FIG. 13. The latch 121 is formed, for example, in a convex shape protruding toward the bottom face 22 of the frame 20, for example, and the latch 121 can be hung on a hollow 122 formed in the frame 20 so as to fasten the rotating part 110 to the frame 20.

Figure 14:
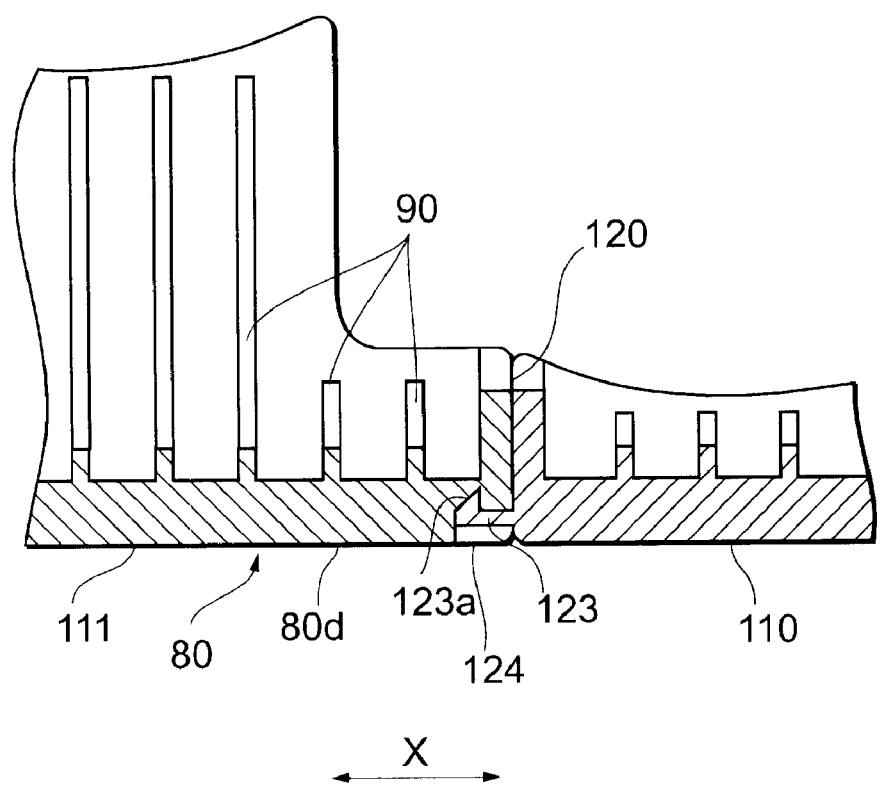
FIG. 14 is a vertical cross-sectional view describing a latch of the rotating part on a base side.

As illustrated in FIG. 14, an end portion of the rotating part 110 on the base 111 side is provided with a latch 123, for example. The latch 123 extends to the base 111 side and a tip thereof is formed with a protrusion 123a protruding upwardly. The base 111 is formed with a recess 124 with which the latch 123 fits. The latch 123 of the rotating part 110 is fitted and latched with the recess 124 of the base 111, whereby the rotating part 110 and the base 111 can be fastened at the lower faces (bottom face 80d) in a flat state.

When the micrometer 10 is to be used in a self-stand state, the rotating part 110 is extended linearly with respect to the base 111 so as to secure the flat and wide bottom face 80d. When the micrometer 10 is used while holding with one hand, for example, the rotating part 110 is rotated until the rotating part 110 becomes in contact with the bottom face 22 of the frame 20 and covers the bottom face 22. Thereby, the heat insulating cover 80 can be made compact and becomes easy to hold.

Similarly to the heat insulating cover 80 of the present embodiment, the heat insulating cover 50 of the above-stated embodiment also includes the rotating part 110, the base 111, and the latches 121 and 123, so that the state where the rotating part 110 rotates to cover the bottom face 22 of the frame 20 and the state where the rotating part 110 and the base 111 form a flat face can be switched.

That is the description of preferred embodiments of the present invention with reference to the attached drawings. However, the present invention is not limited to these embodiments. It is obvious for a person skilled in the art to think of various changes and modifications of the present invention without departing from the spirit described in the claims, which also are considered to fall within the technical scope of the present invention.

For instance, the heat insulating cover according to the present invention may have shapes other than those of the heat insulating covers 50 and 80 as long as the heat insulating cover has a shape accommodating the bottom portion of the frame 20 and is detachable with respect to the frame 20.

What is claimed is:

1. A heat insulating cover for a micrometer, the micrometer including a U-shaped frame supporting an anvil and a spindle at tip end portions thereof so that the anvil and the spindle are coaxially opposed to each other,
    wherein the heat insulating cover is shaped to accommodate a bottom portion of the frame, and is detachable with respect to the frame, said heat insulating cover covering a bottom face of the frame while supporting the bottom portion of the frame by sandwiching from both sides of the frame;
    a first cover portion and a second cover portion engaging with a first face and a second face of the frame, respectively, the first face and the second face opposed to each other;
    an elastic body in each of said first and second cover portions and biasing the first cover portion toward the first face and the second cover portion toward the second face; and,
    wherein the elastic body comprises a flat spring or a coil spring provided from the first cover portion to the second cover portion so as to cover the bottom face of the frame.

2. The heat insulating cover according to claim 1, further comprising hooks engaging with recesses formed in the first face and the second face of the frame, the first face and the second face opposed to each other.

3. The heat insulating cover according to claim 1, wherein said first cover portion has a first inner face that cooperates with said first face to define a first space and said second cover portion has a second inner face that cooperates with said second face to define a second space.

4. The heat insulating cover according to claim 3, wherein each of the inner faces is provided with a rib that protrudes toward the frame.

5. The heat insulating cover according to claim 4, wherein the rib is in a sheet-form with an end face thereof directed to the frame.

6. The heat insulating cover according to claim 3, wherein the each of the inner faces is provided with a protrusion protruding toward the frame, and
    the heat insulating cover is fastened to the frame at the protrusion.

7. The heat insulating cover according to claim 1, further comprising a bottom face allowing the micrometer to self-stand, while accommodating the frame.

8. A heat insulating cover for a micrometer, the micrometer including a U-shaped frame supporting an anvil and a spindle at tip end portions thereof so that the anvil and the spindle are coaxially opposed to each other, said heat insulating cover comprising:
   a base and a rotating part that rotates with reference to the base, wherein
   a bottom face of the cover comprises a continuous flat face including lower faces of the base and the rotating part, and
   the rotating part is rotatable from a state of the flat face formed with the lower faces of the base and the rotating part until the rotating part covers the bottom face of the frame;
   wherein said heat insulating cover is shaped to accommodate a bottom portion of the frame, and is detachable with respect to the frame.

9. The heat insulating cover according to claim 8, wherein the rotating part comprises a latch that is latched with the bottom face of the frame while covering the bottom face of the frame.

10. The heat insulating cover according to claim 8, wherein the rotating part comprises a latch that is latched with the base while forming the flat face.

11. A micrometer, comprising:
   a U-shaped frame supporting an anvil and a spindle at tip end portions thereof so that the anvil and the spindle are coaxially opposed to each other,
   a heat insulating cover that is shaped to accommodate a bottom portion of the frame, and is detachable with respect to the frame, said heat insulating cover including a first cover portion and a second cover portion that cooperate to cover a bottom face of the frame while supporting the bottom portion of the frame by sandwiching from both sides of the frame;
   wherein said first cover portion and said second cover portion engage with a first face and a second face of the frame, respectively, the first face and the second face being opposed to each other; and
   wherein an elastic body in each of said first and second cover portions and biasing the first cover portion toward the first face and the second cover portion toward the second face;
   wherein a bottom face of the heat insulating cover allows the micrometer to self-stand; and,
   wherein the elastic body comprises a flat spring or a coil spring provided from the first cover portion to the second cover portion so as to cover the bottom face of the frame.

12. The micrometer according to claim 11, further comprising hooks engaging with recesses formed in the first face and the second face of the frame.

13. The micrometer according to claim 11, wherein said first cover portion has a first inner face that cooperates with said first face to define a first space and said second cover portion has a second inner face that cooperates with said second face to define a second space.

14. The micrometer according to claim 13, wherein each of the inner faces is provided with a rib that protrudes toward the frame.

15. The micrometer according to claim 14, wherein
   the rib is in a sheet-form with an end face thereof directed to the frame.

16. The micrometer according to claim 13, wherein
   the each of the inner faces is provided with a protrusion protruding toward the frame, and
   the heat insulating cover is fastened to the frame at the protrusion.

17. The micrometer according to claim 11, said heat insulating cover further comprising:
   a base and a rotating part that rotates with reference to the base, wherein
   the bottom face of the cover comprises a continuous flat face including lower faces of the base and the rotating part, and
   the rotating part is rotatable from a state of the flat face formed with the lower faces of the base and the rotating part until the rotating part covers the bottom face of the frame.

18. The micrometer according to claim 17, wherein the rotating part comprises a latch that is latched with the bottom face of the frame while covering the bottom face of the frame.

19. A heat insulating cover for a micrometer, the micrometer including a U-shaped frame supporting an anvil and spindle at tip end portions thereof so that the anvil and the spindle are coaxially opposed to each other, wherein:
   the heat insulating cover is shaped to accommodate a bottom portion of the frame, and is detachable with respect to the frame;
   the heat insulating cover has an inner face forming a space with the accommodated frame; and,
   the inner face is provided with a rib protruding toward the frame.

20. The heat insulating cover according to claim 19, wherein
   the rib is in a sheet-form with an end face thereof directed to the frame.

21. The heat insulating cover according to claim 19, wherein the inner face of the heat insulating cover is provided with a protrusion protruding toward the frame, and
   the heat insulating cover is fastened to the frame at the protrusion.

22. The heat insulating cover according to claim 21, further comprising a bottom face allowing the micrometer to self-stand, while accommodating the frame.

* * * * *